United States Patent
Caponetto et al.

(10) Patent No.: US 12,073,257 B2
(45) Date of Patent: Aug. 27, 2024

(54) PROVISIONING PLUGGABLE SMART SERVICES FOR BROWSER-BASED SMART EDITING TOOLS

(71) Applicant: Red Hat, Inc., Raleigh, NC (US)

(72) Inventors: Guilherme H. Caponetto, Campinas (BR); Eder Ignatowicz, Cambridge, MA (US); Alexandre Porcelli Bakos, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 346 days.

(21) Appl. No.: 17/216,392

(22) Filed: Mar. 29, 2021

(65) Prior Publication Data
US 2022/0308930 A1    Sep. 29, 2022

(51) Int. Cl.
*G06F 9/50*    (2006.01)
*H04L 67/51*    (2022.01)

(52) U.S. Cl.
CPC .......... *G06F 9/5072* (2013.01); *G06F 9/5005* (2013.01); *G06F 9/5077* (2013.01); *H04L 67/51* (2022.05); *G06F 2209/503* (2013.01)

(58) Field of Classification Search
None
See application file for complete search history.

(56) References Cited

U.S. PATENT DOCUMENTS

| | | | |
|---|---|---|---|
| 10,782,937 B2 | 9/2020 | Pezaris | |
| 2006/0235928 A1 | 10/2006 | Cacenco et al. | |
| 2017/0352115 A1 | 12/2017 | Trevathan et al. | |
| 2020/0167195 A1* | 5/2020 | Aronovich | G06F 9/505 |
| 2022/0006854 A1* | 1/2022 | Hulick, Jr. | G06N 20/00 |

OTHER PUBLICATIONS

Gcloud Compute Backend-Services Edit, Google, Jun. 26, 2020, 2 pages.
Managing Backend Servers, Oracle, 2020, 5 pages.
Use Function Compute as the Backend Service of an API Operation, Alibabacloud, Dec. 2, 2020, 17 pages.
Eder Ignatowicz, 'Kogito Tooling 0.7.0 Released!', Medium.com, Oct. 15, 2020, 8 pages.
Karina Varela, 'Kogito for Quarkus Intelligent Applications', Red Hat Inc., Aug. 29, 2019, 8 pages.

* cited by examiner

*Primary Examiner* — Sisley N Kim
(74) *Attorney, Agent, or Firm* — Womble Bond Dickinson (US) LLP

(57) ABSTRACT

Systems and methods for providing optional services for browser-based smart editing tools. In one implementation, a client extension on a client device receives a request to perform a function of a service. The client extension identifies an execution parameter for the service. The client extension determines a local service availability by evaluating a logical condition comprising the execution parameter. In view of the local service availability, the client extension causes the function of the service to be executed either on one of the client device or on a server device.

20 Claims, 4 Drawing Sheets

PROVISIONING PLUGGABLE SMART SERVICES FOR BROWSER-BASED SMART EDITING TOOLS

TECHNICAL FIELD

The present disclosure is generally related to source code text and graphical editors, and more particularly, to provisioning pluggable smart services for browser-based smart editing tools.

BACKGROUND

Computer systems can be programmed to perform operations specified by sequences of instructions referred to as computer program code. Application programs, operating systems, and other computer programs are implemented as computer program code that is written by human developers with the assistance of applications that perform tasks related to code development. These applications are often referred to as development tools, development environments, or integrated development environments (IDEs). An IDE can provide a text and/or graphical editor for creating and editing source code in a particular programming language, as well as tools for creating user interfaces, compiling source code to produce executable program code, and running the executable code. Source code editors are text and/or graphical editors that can be part of an IDE, or that can be a standalone application.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
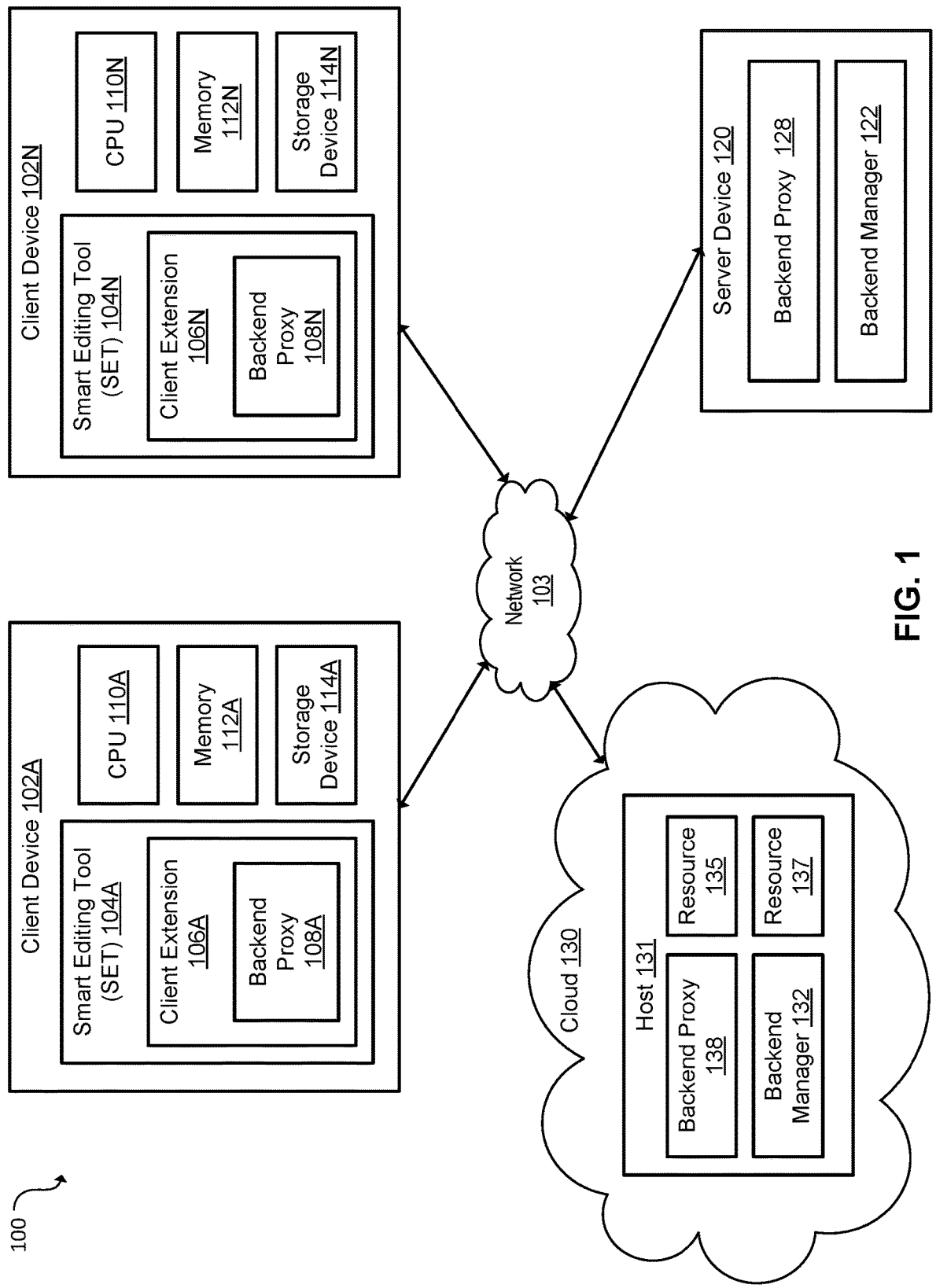
FIG. 1 depicts a block diagram of an example system architecture operating in accordance with one or more aspects of the present disclosure.

Implementations of the disclosure are directed to provisioning pluggable optional smart services for browser-based smart editing tools.

Smart editing tools (SETs) provide developers with a text-based and/or graphics-based source code editor in which to create and edit source code. A SET is a fully functional limited editor that can be augmented by optional smart services. Many SETs offer a browser-based option, through which developers can write and edit source code without having to download and/or install a heavyweight full-featured integrated development environment (IDE) on their local device. Browser-based smart editing tools can be augmented by smart services, which can expand the authoring experience of the SET. A rich ecosystem of smart services can be provided through extensions, which makes browser-based IDEs similar to traditional heavyweight IDEs. Extensions are software components that provide additional optional features that add functionality to the SET, such as programming language support and debuggers.

Many of the smart services offered through extensions of SETs consume a large quantity of resources (such as memory, disk storage, and CPU usage). Various browser-based smart editing tools can be limited to the environment in which they are running. A smart editing tool running on a local machine can be limited to the local machine's resources, whereas a smart editing tool running on the cloud is traditionally limited to the resources provided by the cloud environment. Due to the shared nature of cloud computing environments, a cloud environment can provide a weak execution environment with limited resources, such as limited memory and/or CPU usage capability. Running a smart editor enhanced with smart services in a weak computing environment can result in higher latency due to limited CPU usage capability, and reduced execution performance.

Aspects of the present disclosure address the above noted and other deficiencies by providing optional smart services for browser-based smart editing tools. Smart services can be provided through a client extension installed on the user's device. The client extension can be an additional software component added to the SET that enables smart services to be executed either on a user's device or on a remote server device. Without the client extension, the user can still use the SET in a standalone mode. With the client extension, the SET running on the user's device can utilize the local smart services available on the user's local device, cloud-based smart services available on a remote device, and/or a combination of local and remote smart services. Furthermore, the client extension can determine in which environment to execute the smart services. Smart services can be executed inside the user's SET or can be redirected to an external remote cloud smart service. The switch from local execution to remote execution can be transparent to the SET and to the user. Aspects of the present disclosure create the client extension that provides optional smart services for SETs, allowing the SET experience to be augmented by executing smart service calls to a provider that supplies a given smart service.

Aspects of the present disclosure include smart services and capabilities. A smart service can be any complimentary service that expands the authoring experience of a given SET. A smart service has its own life cycle, which can be controlled by a local or remote backend manager. A smart service has defined start and stop routines (which can include a defined start and stop time), as well as specific requirements for successful execution. A smart service can optionally expose operations through one or more capabilities.

A capability is a function of the smart service and can be exposed via an application programming interface (API). For example, a capability for performing a particular data processing task can be implemented by using the user's machine or by accessing an HTTP endpoint. In embodiments, the API methods provided by a capability can wrap their return in a particular object, which can include a response status (e.g., CapabilityResponse object, which includes a CapabilityResponseStatus). By doing so, callers of the capability can handle the response in adverse situations, for example, if the smart service is not available or the requirements of the smart service have not been satisfied. In embodiments, when the smart service is not available or the requirements have not been satisfied, the SET can continue running with limited capability. That is, the unavailability of the smart service may not result in failure of the SET, but rather the SET may be limited to the smart services that are available.

A backend manager can control the lifecycle of the smart services. The backend manager can be remote, i.e., on a server device. An instance of the backend manager can be initiated in conjunction with the client's SET instance. That is, an instance of the backend manager associated with a client's SET can be initiated when the SET is activated, and stopped when it is deactivated. The backend manager can also provide a mechanism to register smart services, e.g., as bootstrap services or lazy services. Smart services that are available as soon as the instance of the backend manager associated with the client's SET is initiated can be registered as bootstrap services, whereas smart services that can be made available upon request can be registered as lazy services. The registered smart services are stopped as soon as the instance of backend manager associated with the client's SET is stopped.

A backend proxy can act as an intermediary between the SET and the backend manager. The backend proxy on the client device can receive, from the SET, an instruction directed to executing a function of the smart service (i.e., executing a capability of the service). The backend proxy can determine whether to execute the function on the client device, or to connect to the backend manager on the server device. If a smart service is not available (e.g., the requirements of the smart service are not satisfied), the backend proxy can attempt resolving the requested function of the smart service locally, on the client device. In embodiments, the smart service can be an internal one, i.e., one that is implemented in the extension code available in the SET on the client device. In such case, the SET can execute the requested smart service without accessing external code. The smart service code can be exposed through a REST endpoint. In some embodiments, an external smart service can be accessed through HTTP endpoints, and may be accessed through a uniform resource locator (URL).

In some embodiments, upon receiving a request to execute a capability, the SET can call the requested capability's application programming interface (API). In some implementations, the user's local environment can have sufficient resources (e.g., CPU, memory) to execute the smart service, in which case the client extension can decide to execute the smart service on the user's device. Alternatively, the SET can run in a cloud-based environment. Cloud-based environments often share computing resources among several users, which can result in each of the users having a limited and weak computing environment. The backend proxy can query the user's computing environment to determine the resources available to the user (either on the user's local computing device, or in the cloud-based environment in which the SET is running). The backend proxy can compare the resources available to the user to the resources available remotely (e.g., on a server device) to identify the stronger execution environment in which to run the smart service. The backend proxy in the client extension can access, through an API, a backend manager on a server device. The backend manager on the server device can provide the stronger execution environment on which to run the smart service. If the backend proxy on the client extension determines that the backend manager is available, the client extension can send the execution request to the backend manager, which will execute the smart service and return a result to the SET.

Aspects of the present disclosure present advantages over conventional solutions to the issues noted above by providing editor capabilities to be executed in either a user's local computing environment or on a remote computing environment. Routing smart services to faster endpoints reduces latency associated with executing the smart services, providing a benefit to the user. Additionally, routing the smart services to a more suitable executing environment can avoid overloading the user's available computing resources. By switching seamlessly and transparently between the local execution environment and a remote execution environment, aspects of the present disclosure can provide a fully-featured rich editing tool (similar to a heavyweight IDE) in a lightweight browser-based version.

FIG. 1 is a diagram of one embodiment of a system architecture for provisioning pluggable optional smart services for browser-based smart editing tools, in accordance with one or more aspects of the present disclosure. The distributed computer system 100 can include client devices 102A-102N, a cloud 130, and a server device 120, communicably connected over a network 103. There may be any number of client devices 102A-N, any number of clouds 130, and any number of server devices 120. The network 103 can be a private network (e.g., a local area network (LAN), a wide area network (WAN), intranet, etc.) or a public network (e.g., the Internet).

The client devices 102A-102N and server device 120 can be a server, a workstation, a personal computer (PC), a mobile phone, a smart phone, a mobile computing device, a personal digital assistant (PDA), tablet, laptop computer, thin client, etc. The client devices 102A-102N can include one or more central processing units (CPUs) 110A-110B, memory 112A-112B, and storage devices 114A-114N (e.g., a data storage device or mass storage device, such as a magnetic or optical storage based disk, tape or hard drive). Client devices 102A-102N can also include one or more peripheral devices (not pictured), which can include network devices, graphics devices, system components (e.g., bridges, ports, buses) media devices, (e.g., video cards, sounds cards, etc.).

The client devices 102A-102N can include a smart editing tool (SET) 104A-N and client extension 106A-N. The client extension can include a backend proxy 108A-N. The SET 104A-N can be a browser-based editing tool, or in some implementations, can be a smart editing tool residing on the client device 102A-N. The client extension 106A-N can be implemented by one or more processes running on the client device and can provide access to smart services. The client extension 106A-N can enhance the functionality of the SET 104A-N of client device 102A-N by providing optional smart services to the SET 104A-N, and by enabling the smart services to be executed either on the client device 102A-N or on the server device 120. The backend proxy 108A-N can be implemented by one or more processes running on the client device and can act as an intermediary between the SET 104A-N of client device 102A-N and the server 120.

In embodiments, the SET 104A-N can receive an instruction requesting to execute a function of a smart service implemented by the client extension 106A-N. The SET 104A-N can transmit the request to execute the function to the client extension 106A-N. The backend proxy 108A-N of the client extension 106A-N can access the API associated with the requested function to determine the execution parameter(s) of the requested function. The execution parameter(s) can include the availability of smart service on the client device 102A-N, on the server device 120, and/or on the cloud 130, and/or computing resources to execute the smart service. The backend proxy 108A-N can evaluate the execution parameter(s) to determine whether to execute the function on the local machine (on client device 102A-N) or on a remote machine (e.g., server device 120, or cloud 130). For example, if the computing environment of the respective client device 102A-N does not have sufficient available computing resources to execute the requested function of the smart service, or if the smart service is not available locally on the client device 102A-N, the backend proxy 108A-N can determine to execute the function on a remote machine by transmitting the instruction to execute the function to the backend proxy 128 of server device 120 or to the backend proxy 138 of cloud 130. On the other hand, if the backend proxy 108A-N determines that the computing environment of the respective client device 102A-N has sufficient available computing resources to execute the requested function of the smart service, and that the smart service is available locally on the client device 102A-N, the backend proxy 108A-N can determine to execute the function on the respective client device 102A-N. That is, the smart service can be implemented in the extension code available in the SET 104A-N on the client device 102A-N, and hence the backend proxy 108A-N can resolve the required smart service by executing the received instruction within the extension code available in the SET 104A-N on the client device 102A-N.

In embodiments, the smart service can be unavailable both locally and remotely. In such instances, the SET can continue running with limited capability. That is, even though the smart service is not available, the SET may not fail but rather may be limited to the smart service(s) that are available.

The backend proxy 108A-N can evaluate the execution parameter(s) in a number of ways. The execution parameter(s) can include the computing resources required to execute the smart service. The backend proxy 108A-N can query the client device 102A-N to determine the computing resources available on the client device 102A-N. The backend proxy 108A-N can query the server device 120 and/or the cloud 130 to determine the available computing resources of each platform. The computing resources can include disk storage space, memory, and/or CPUs. The backend proxy 108A-N can compare the computing resources available locally on the corresponding client device 102A-N, to the computing resources available remotely (on server device 120 and/or cloud 130) to determine the stronger execution environment. In embodiments, the backend proxy 108A-N can transmit the execution request to the stronger computing environment on which the smart service is available. For example, the stronger computing environment may be available locally on client device 102A-N, however if the smart service is not available locally on client device 102A-N, backend proxy 108A-N can transmit the execution request to the next stronger computing environment (i.e., on server device 120 or cloud 130). In embodiments, the backend proxy 108A-N can determine to execute the request locally on client device 102A-N even though a stronger computing environment is available remotely if the client device 102A-N has sufficient computing resources to successfully execute the request. The backend proxy 108A-N can compare the computing resources available on client device 102A-N to a threshold amount of computing resources included in the execution parameter(s). If the computing resources available on the client device 102A-N satisfy the threshold, the backend proxy 108A-N can determine to execute the request locally on client device 102A-N, thus avoiding unnecessarily transmitting a request to execute a function that can be successfully executed locally.

The server device 120 can include a backend proxy 128 and a backend manager 122. The backend proxy 128 can be implemented by one or more processes running on the server device 120 and can act as an intermediary between client device 102A-N and the backend manager 122. The backend proxy 128 can communicate with the backend proxy 108A-N. The backend proxy 128 can receive an instruction to execute a function of the smart service from backend proxy 108A-N. The backend proxy 128 can determine the availability of the backend manager 122, e.g. via an API call. Upon determining that the backend manager 122 is available, the backend proxy 128 can cause a smart service to be executed by the backend manager 122 by transmitting the instruction to the backend manager 122 to execute the requested function of the smart service. The backend manager 122 can return a response (which can include the result of the execution) to backend proxy 128, which can return the response to backend proxy 108A-N. The backend proxy 108A-N can return the response to the client extension 106A-N, which can in turn return the response to SET 104A-N.

In embodiments, the backend proxy 128 can determine that the backend manager 122 is not available. Backend proxy 128 can notify the backend proxy 108A-N that the backend manager 122 is not available. The backend proxy 108A-N can return an error to the client extension 106A-N. Alternatively, the backend proxy 108A-N can execute the instruction locally if the requested smart service can be implemented in the extension code available in the SET 104A-N on the client device 102A-N. Alternatively, if the smart service is not available locally or remotely, the SET can continue running with limited capability (i.e., the SET can be limited to the smart service(s) and other functionalities that are available, thus avoiding SET fail state).

In embodiments, the backend manager 122 can control the lifecycle of the smart services. An instance of the backend manager 122 associated with a client device (e.g., with client device 102A) can run in conjunction with the SET 104 (e.g., SET 104A). The instance of the backend manager 122 can be started up and stopped along with the SET running instance. For example, an instance of the backend manager 122 can be started up once the client extension 106A is activated, and stopped when the client extension 106A is deactivated (usually right before the client extension is closed).

The backend manager 122 can also provide a mechanism to register both bootstrap and lazy smart services. For smart services that are available as soon as the instance of the backend manager 122 associated with the SET 104A-N is started, those smart services can be registered as bootstrap services. For smart services that can be made available upon request (e.g., on the first usage), those smart services can be registered as lazy smart services. The registered smart services are stopped as soon as the backend manager is stopped.

For example, the client extension can take advantage of Quarkus™ features (such as fast boot time and low memory usage) by providing Java™ smart services either locally (102A-N) or remotely (120). Quarkus is a Java application framework designed for use in containers and/or virtual machines. A container can refer to an isolated set of resources allocated to executing an application and/or process independent from other applications and/or processes. A virtual machine can be a software implementation of a machine (computer) that includes its own operating system and executes application programs. The backend manager can control the lifecycle of the Quarkus app, and the smart services can be associated with respective representational state transfer (REST) endpoints available to the SET 104. REST is a set of architectural constrains, which can use a subset of HTTP. When a client request is made via a REST API, the client transfers a representation of the resource to the REST endpoint. For example, if there is a Java smart service exposed under a certain endpoint and associated with a capability, the service can be accessed seamlessly by the SET client extension through the capability API on the backend proxy. In this example, the backend proxy can access the endpoint via an HTTP request and return the response to the SET client extension. In cases in which the smart service is remote with respect to the client device, the backend proxy can provide the full URL to access the capability. In such instances, the backend proxy can determine whether the HTTP server is available in the cloud via the REST endpoints.

In embodiments, the smart service can perform multiple steps that can be executed by either the client extension 106A and/or the backend manager 122. An example of a smart service can be running a scenario simulation, for which the smart service can build the project, generate artifacts, run the Quarkus app, and execute a specific HTTP call to run the scenario. The backend proxy 108A can determine that the client device 102A has sufficient computing resources available to build the project and generate the artifacts (i.e., the by-products of software development, such as the compiled project), however the Quarkus app may be only available on the server device 120. In such an example, the backend proxy 108A can determine to build the project and generate the artifacts locally using the client extension 106A, and can send the project and artifacts to the backend manager 122 to run the Quarkus app and execute the HTTP call. The backend manager 122 can return a result to the client device 102 through the backend proxy 128 and backend proxy 108A.

In embodiments, the backend proxy and/or backend manager can be provided by a cloud. As illustrated in FIG. 1, cloud 130 can include a host 131, which can provide one or more resources 135, 137, as well as a backend proxy 138 and backend manager 132. Resources 135, 137 can refer to a computing resource, such as disk storage, memory, and/or vCPUs, for example. The backend proxy 138 can at as an intermediary between client device 102A-N and the backend manager 132. In embodiments, backend proxy 108A-108N of client devices 102A-102N can determine that the cloud 130 can provide a stronger execution environment in which to execute the smart service. The backend proxy 138 can communicate with the backend proxy 108A-N of client device 102A-N. For example, the backend proxy 138 can receive an instruction to execute a function of the smart service from backend proxy 108A-N. The backend proxy 138 can execute in the same way as backend proxy 128 as described above, and the backend manager 132 can execute in the same way as backend manager 122 as describe above.

Figure 2:
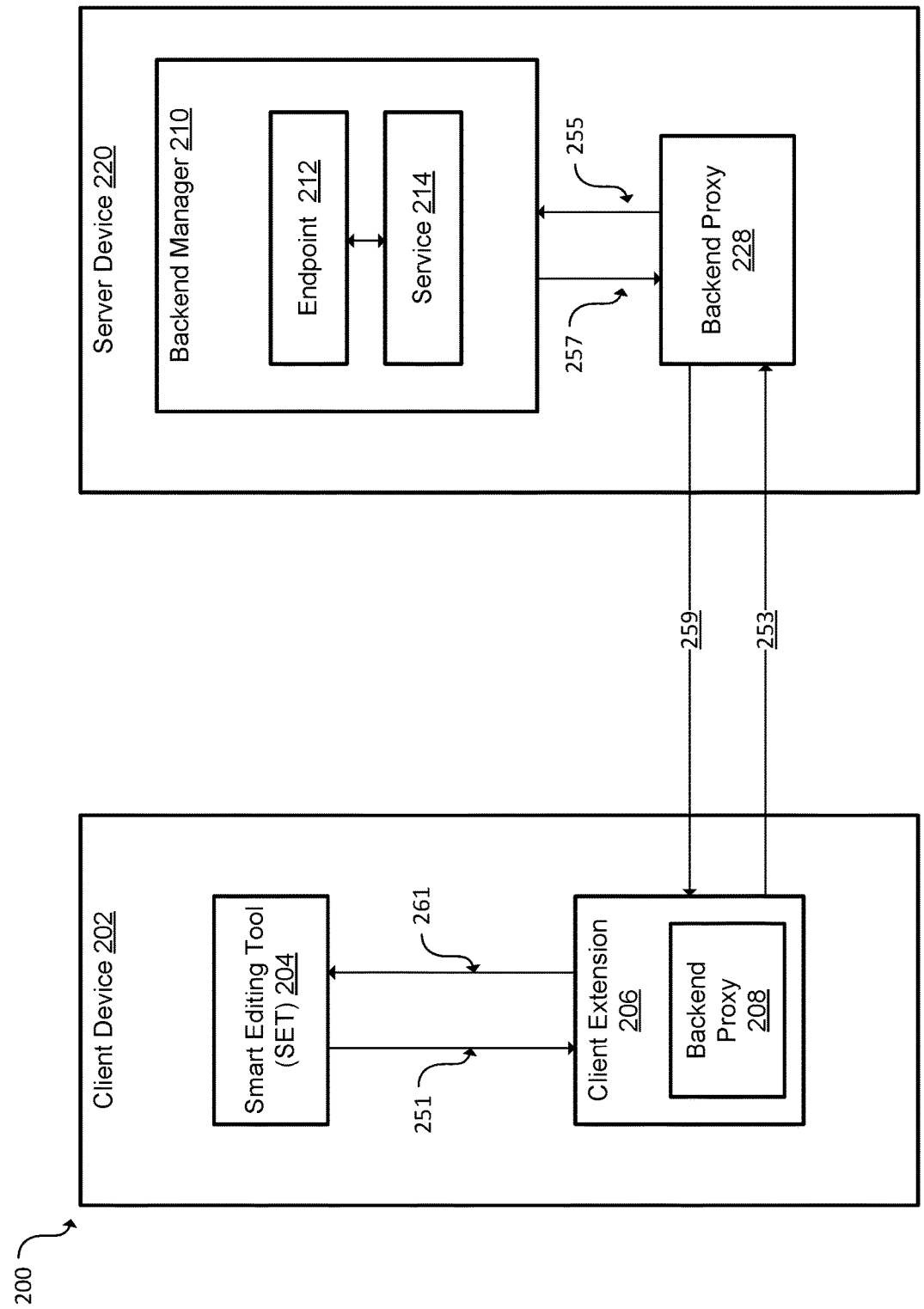
FIG. 2 depicts a block diagram illustrating an implementation of a method executed for provisioning pluggable optional smart services in a browser-based smart editing tool, in accordance with one or more aspects of the present disclosure.

FIG. 2 depicts a block diagram of a method 200 for provisioning pluggable optional smart services in a browser-based smart editing tool, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., client device 102A, cloud 130, and/or server device 120 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, the process can begin with receiving, e.g., via a graphical user interface of client device 102A-N of FIG. 1, a request to execute an instruction using smart editing tool (SET) 204. The instruction can be a request to execute a capability of a smart service provided within the SET 204. A smart service can augment the SET by providing additional authoring functionalities. For example, a smart service can be providing auto-completion for source code, and the capability of the smart service can be the specific auto-completion displayed to the user of the client device 202. A capability can be a function of the smart service. In embodiments, the SET 204 can perform in a standalone environment, in which it is not communicably connected with a client extension 206 nor is it communicably connected with a server device 220. In such instances, the SET 204 can determine whether the smart service is available on the client 202. If it is, the SET 204 can execute the instruction received from the user within the SET 204. If it is not available, the SET 204 can return an error to the user, informing the user that the capability and/or smart service is not available.

At operation 251, the SET 204 can send the instruction to the client extension 206. In embodiments, the client extension 206 can be part of the SET. The client extension 206 can include a backend proxy 208. The backend proxy 208 on client device 202 can determine whether to execute the function of the smart service on the client device 202 or on the server device 220. The determination of whether to execute the function of the smart service on the client device 202 or on the server device 220 can be based on one or more criteria, such as whether the smart service is available on the client device 202 and/or the server device 220, whether the requirements of the smart service have been satisfied, or a determination of which computing environment (the client device 202 or the server device 220) provides the stronger computing environment in which to execute the function of the smart service.

In embodiments, the backend proxy 208 can determine whether the backend manager 210 on the server device 220 is available to the user. In embodiments, the server device 220 can be execute by a cloud. The availability of the backend manager 210 can depend on the presence of a connection between the client device 202 and the server device 220 (that is, if the client device 202 is not presently connected with the server device 220, the backend proxy 208 can determine that the backend manager 210 is not available). Additionally or alternatively, the backend proxy 228 can determine that the backend manager 210 is not available, and can notify the backend proxy 208 of the unavailability of the backend manager 210. In such instances, the backend proxy 208 can execute the function of the smart service locally on the client device 202 and return a result to the SET 204. The SET 204 can then return a result to the user.

In embodiments, the backend proxy 208 can determine to execute the function of the smart service locally on the client device 202 even when the backend manager 210 is available. For example, the backend proxy 208 can determine that the smart service is available on the client device (i.e., the smart service can be implemented in the extension code available in the SET 204) and that the computing resources available on the client 202 satisfy or exceed the computing resources required to execute the function of the smart service. In such a case, it may be more efficient to execute the function locally on client device 202 rather than transmitting the request to the backend manager 210. Hence, the backend proxy 208 can execute the instruction requesting execution of a function of the smart service on client device 202.

In embodiments, the backend proxy 208 can determine an execution parameter of the smart service. The smart service can be exposed by an API, which can include one or more parameters involved in the execution of the function of the smart service. The backend proxy 208 can use an API call to determine the execution parameter(s) involved with executing the function of the smart service. The parameters can be a first amount of computing resources (such as CPU usage, memory, disk space, etc.) representing the minimum computing resources required to execute the function of the smart service, and/or a second amount of computing resource requirements representing the computing resources that would result in a better performance of the function of the smart service. The parameters can include other considerations involved in the execution of the function.

The backend proxy 208 can determine the computing resources available to the client device 202, and/or the computing resources available on the server device 220. In embodiments, the backend proxy 208 can determine the computing resources available to the client device 202 by querying, for example, the operating system running on the client device 202. In embodiments, the client device 202 can be running in a cloud environment, in which case the backend proxy 208 can determine the cloud resources available to the client device 202. The backend proxy 208 can query the cloud provider, for example using a cloud API, to determine the resources available to the user in the cloud computing environment. In embodiments, the backend proxy 208 can store the amount of resources available to the client 202 (either locally and/or in the cloud computing environment) in a data structure (not pictured) for future reference.

The backend proxy 208 can compare the resources available on client device 202 to the execution parameter(s) to determine a logical condition. For example, if the resources available on the client device 202 meet or surpass the execution parameter(s) associated with the execution of the function of the service (e.g., either the first amount of computing resources and/or the second amount of computing resources), the logical condition associated with the service availability can be TRUE. If the resources available on the client device 202 do not meet the execution parameter(s) associated with the execution of the function of the service, the backend proxy 208 can determine that the logical condition associated with the service availability is FALSE. In other embodiments, the backend proxy 208 can determine whether the resources available on the server device 220 satisfy or exceed the execution parameter(s). If so, the backend proxy 208 can determine that the logical condition associated with the local service availability is FALSE (i.e., that the service is to be executed on the server device 220 rather than locally on the client device 202). In embodiments, the logical condition can be a determination of whether the service is available locally on the client device 202, and/or available on the server device 220.

Based on the local service availability, the backend proxy 208 can determine whether to execute the received instruction requesting execution of the function of the service on the client device 202 or the server device 220. For example, if the logical condition is TRUE, the backend proxy 208 can determine to execute the instruction on the client device 202. The client extension 206 can execute the instruction and return the result to the SET 204. If the logical condition is FALSE, the backend proxy 208 can cause the instruction to be executed on the server device 220 to transmit the instruction to backend proxy 228.

At operation 253, the backend proxy 208 on client device 202 can transmit the instruction to backend proxy 228 on the server device 220. At operation 255, the backend proxy 228 can transmit the instruction to the backend manager 210. The backend manager 210 can access an endpoint 212 associated with the service 214, and transmit to the endpoint the request to perform the function of the service. The backend manager 210 can receive a result from the endpoint 212. At operation 257, the backend manager 210 can send a response to the backend proxy 228. The response can be, for example, a promise resolved.

At operation 259, the backend proxy 228 can send the response to the backend proxy 208. At operation 261, the client extension 206 can return the result to SET 204, and hence, to the user.

Figure 3:
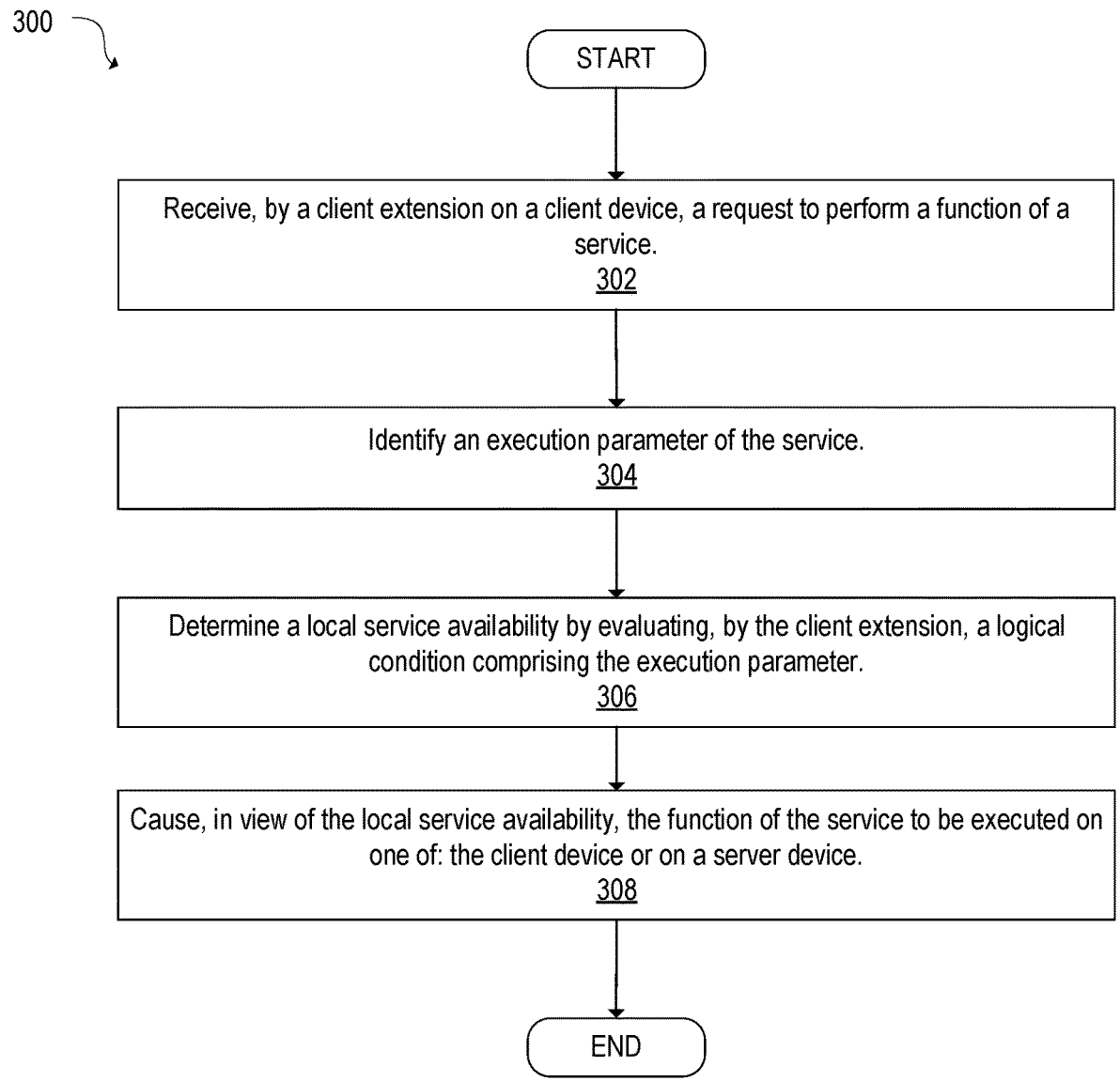
FIG. 3 is a flow diagram of an example method of providing optional smart services for a browser-based smart editing tool, in accordance with one or more aspects of the present disclosure.

FIG. 3 depicts a flow diagram of an example method 300 for providing optional services for a browser-based smart editing tool, in accordance with one or more aspects of the present disclosure. Method 300 may be performed by processing logic (e.g., in computer system 100 of FIG. 1) that may comprise hardware (e.g., circuitry, dedicated logic, programmable logic, microcode, etc.), software (such as instructions run on a processing device), firmware, or a combination thereof. In one embodiment, method 300 is performed primarily by a client device (e.g., by backend proxy 108A-N residing on the client device 102A-N of FIG. 1).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 302, the processing logic receives, at a client extension on a client device, a request to perform a function of a service. In embodiments, the client extension can be part of a smart editing tool (SET) residing on the client device. In embodiments, the client extension can be part of a browser-based SET. The service can be implemented by executing a function of an application programming interface (API). In embodiments, the function can be called by a user making a function call in a program.

At block 304, the processing logic identifies an execution parameter of the service. The execution parameter of the service can include the computing resources required to execute the function of the service, such as memory requirements, storage space requirements, CPU usage, etc. In embodiments, the execution parameter can be an indication that the function to be executed is part of a smart service provided by a remote service. The execution parameter can be exposed by the API. Additionally or alternatively, the client extension can include the execution parameter for the function.

At block 306, the processing logic determines a local service availability by evaluating, by the client extension, a logical condition comprising the execution parameter. In embodiments, the logical condition can be an indication of whether the service is available on the client device. That is, the service can be implemented in the client extension code available in the SET on the client device. Alternatively or additionally, the logical condition can be a determination of whether the execution parameter is satisfied. In embodiments, the execution parameter can include the minimum resources required to execute the function of the service. The logical condition can be a determination of whether the client device satisfies the minimum resources required to execute the function of the service. The logical condition can include a determination of whether the function of the service is available on the client device, and/or whether execution of the function of the service on the client device is desirable. For example, even if the client device has satisfied the minimum computing resources required to successfully execute the function of the service, the processing logic can determine that it is more desirable to execute the function on a server device if the server has more computing resources available (i.e., the processing logic can determine, based on the computing resources available on the client device compared to the computing resources available on the server device, that executing the function on the server would reduce latency as compared to executing the function on the client device). Additionally or alternatively, the service can be only executable on a server device (e.g., the requirements to execute the service on the client device may not have been satisfied, such as the code is not present on the client device, or the client device does not have the Java installed).

Determining the local service availability involves evaluating the logical condition comprising the execution parameter. At block 308, the processing logic causes, in view of the local service availability, the function of the service to be executed on the client device or on a server device. In embodiments, the processing logic can cause the function of the service to be executed by accessing an endpoint associated with the service. The processing logic can transmit the request to perform the function of the service to the endpoint, and can receive a result from the endpoint. The processing logic can then transmit the result to the client extension.

In embodiments, the endpoint associated with the service can be on a cloud computing environment. That is, in response to causing the function of the service to be executed on the server device, the processing logic can access an endpoint on a cloud computing environment. In embodiments, the endpoint associated with the service can be on the client device. That is, in response to causing the function of the service to be executed on the client device, the processing logic can access an endpoint the client device.

Figure 4:
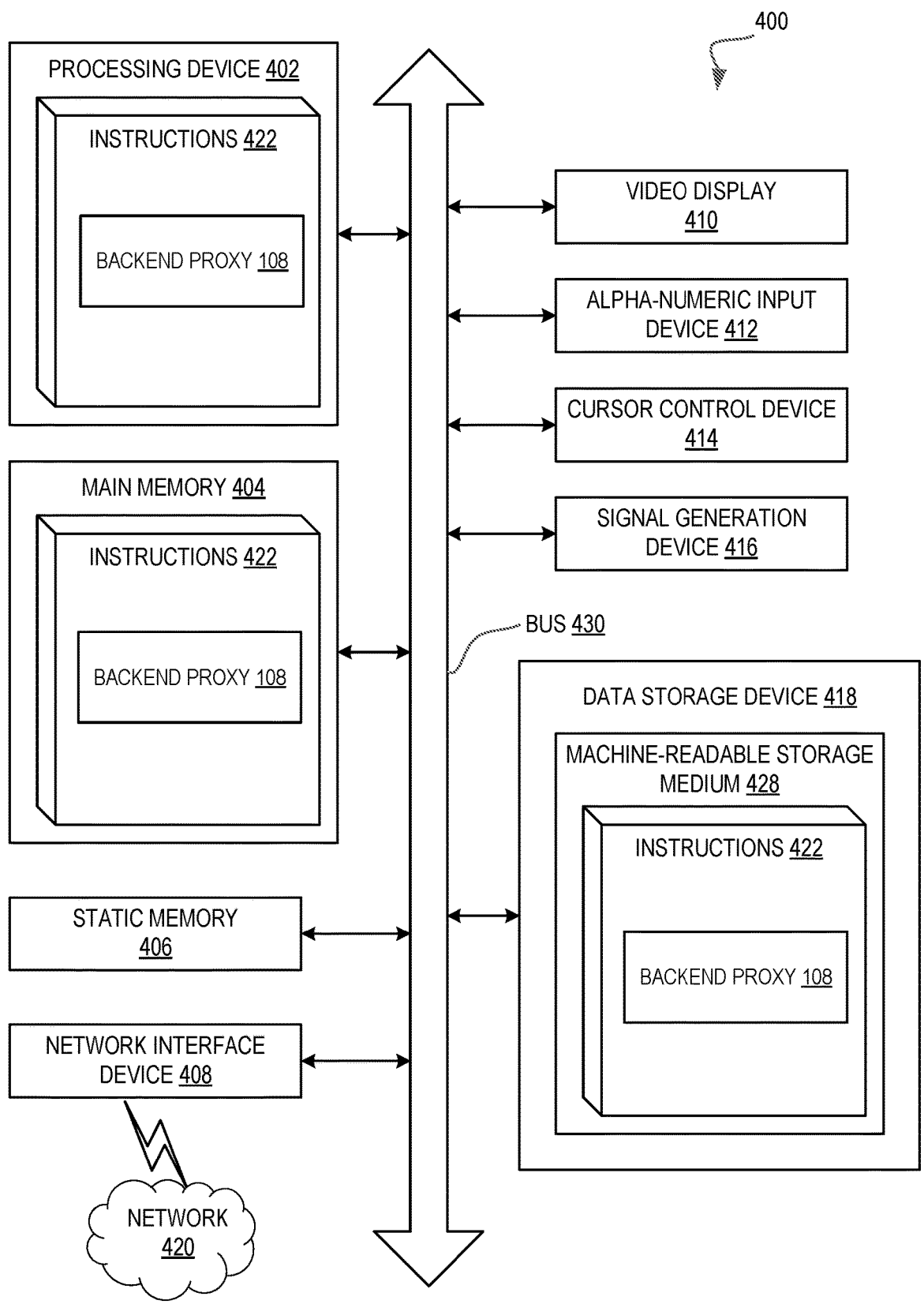
FIG. 4 depicts a block diagram of an illustrative computer system operating in accordance with one or more aspects of the present disclosure.

FIG. 4 is a diagrammatic representation of a machine in the exemplary form of a computer system 400 within which a set of instructions for causing the machine to perform any one or more of the methodologies discussed herein may be executed. In various illustrative examples, computer system 400 may correspond to computer system 100 of FIG. 1. Computer system 400 may be included within a data center that supports virtualization and/or containerization. Virtualization within a data center results in a physical system being virtualized using virtual machines (VMs) to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources. A container can hold an app and all the files necessary to run the app. A container can be used to package single functions that perform specific tasks (known as a microservice). Multiple containers can be coupled together and managed by a container orchestration platform within a computer system 400.

In certain embodiments, computer system 400 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 400 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 400 may include a processing device 402, a main memory 404 (e.g., read-only memory (ROM), flash memory, dynamic random access memory (DRAM) (such as synchronous DRAM (SDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 402 may also be one or more special-purpose processing devices such as an application specific integrated circuit (ASIC), a field programmable gate array (FPGA), a digital signal processor (DSP), network processor, or the like. Processing device 402 may be configured to execute backend proxy 108 for programming the operations and steps discussed herein.

Computer system 400 may further include a network interface device 408. Computer system 400 may also include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., the backend proxy 108) embodying any one or more of the methodologies of functions described herein. The backend proxy 108 may also reside, completely or at least partially, within main memory 404 and/or within processing device 402 during execution thereof by computer system 400; main memory 404 and processing device 402 also constituting machine-readable storage media. The backend proxy 108 may further be transmitted or received over a network 426 via network interface device 408.

Machine-readable storage medium 428 may also be used to store the device queue manner logic persistently. While machine readable storage medium 428 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
receiving, by a client extension on a client device, a request to perform a function of a service;
identifying an execution parameter of the service, wherein the execution parameter comprises a parameter associated with computing resource requirements;
determining a local service availability by evaluating, by the client extension, a logical condition comprising the execution parameter;
identifying a first computing resource available on the client device and a second computing resource available on a server device;
responsive to determining that a first parameter associated with the first computing resource available on the client device exceeds the parameter associated with the computing resource requirements, and that the first parameter associated with the first computing resource available on the client device does not exceed a second parameter associated with the second computing resource available on the server device, determining that the local service availability satisfies a criterion, wherein the first parameter and the second parameter include two of: an amount of disk space, an amount of memory, or a number of central processing units (CPUs); and
responsive to determining that the local service availability satisfies the criterion, causing the function of the service to be executed on the server device.

2. The method of claim 1, wherein the execution parameter reflects the computing resource requirements comprising at least one of: the amount of disk space, the amount of memory, or the number of CPUs.

3. The method of claim 1, wherein the execution parameter of the service is exposed by an application programming interface (API).

4. The method of claim 2, further comprising:
responsive to determining that the first parameter associated with the first computing resource available on the client device does not exceed the parameter associated with the computing resource requirements, determining that the local service availability satisfies the criterion; and
responsive to determining that the first parameter associated with the first computing resource available on the client device exceeds the parameter associated with the computing resource requirements:
comparing the first parameter associated with the first computing resource available on the client device to the second parameter associated with the second computing resource available on the server device; and
responsive to determining, based on the comparing, that the first parameter associated with the first computing resource available on the client device exceeds the second parameter associated with the second computing resource available on the server device, determining that the local service availability does not satisfy the criterion.

5. The method of claim 1, further comprising:
accessing an endpoint associated with the service;
transmitting, to the endpoint, the request to perform the function of the service;
receiving a result from the endpoint; and
transmitting the result to the client extension.

6. The method of claim 5, wherein the endpoint associated with the service is on a cloud computing environment.

7. The method of claim 5, wherein in response to determining that the local service availability does not satisfy the criterion, causing the function of the service to be executed on the client device, the endpoint associated with the service is on the client device.

8. A system comprising:
a memory; and
a processing device operatively coupled to the memory, the processing device to:
receive, by a client extension on a client device, a request to perform a function of a service;
identify an execution parameter of the service, wherein the execution parameter comprises a parameter associated with computing resource requirements;
determine a local service availability by evaluating, by the client extension, a logical condition comprising the execution parameter;
identify a first computing resource available on the client device and a second computing resource available on a server device;
responsive to a determination that a first parameter associated with the first computing resource available on the client device exceeds the parameter associated with the computing resource requirements, and that the first parameter associated with the first computing resource available on the client device does not exceed a second parameter associated with the second computing resource available on the server device, determine that the local service availability satisfies a criterion, wherein the first parameter and the second parameter include two of: an amount of disk space, an amount of first memory, or a number of central processing units (CPUs); and
responsive to the determination that the local service availability satisfies the criterion, cause the function of the service to be executed on the server device.

9. The system of claim 8, wherein the execution parameter reflects the computing resource requirements comprising at least one of: the amount of disk space, the amount of first memory, or the number of central processing units CPUs.

10. The system of claim 8, wherein the execution parameter of the service is exposed by an application programming interface (API).

11. The system of claim 9, wherein the processing device is further to:
responsive to a determination that the first parameter associated with the first computing resource available on the client device does not exceed the parameter associated with the computing resource requirements, determine that the local service availability satisfies the criterion; and
responsive to the determination that the first parameter associated with the first computing resource available on the client device exceeds the parameter associated with the computing resource requirements:
compare the first parameter associated with the first computing resource available on the client device to the second parameter associated with the second computing resource available on the server device; and
responsive to a determination that the first parameter associated with the first computing resource available on the client device exceeds the second parameter associated with the second computing resource available on the server device, determine, based on the comparison, that the local service availability does not satisfy the criterion.

12. The system of claim 8, wherein the processing device is further to:
- access an endpoint associated with the service;
- transmit, to the endpoint, the request to perform the function of the service;
- receive a result from the endpoint; and
- transmit the result to the client extension.

13. The system of claim 12, wherein the endpoint associated with the service is on a cloud computing environment.

14. A non-transitory computer-readable storage medium comprising instructions that, when executed by a processing device, cause the processing device to:
- receive, by a client extension on a client device, a request to perform a function of a service;
- identify an execution parameter of the service, wherein the execution parameter comprises a parameter associated with computing resource requirements;
- determine a local service availability by evaluating, by the client extension, a logical condition comprising the execution parameter;
- identify a first computing resource available on the client device and a second computing resource available on a server device;
- responsive to a determination that a first parameter associated with the first computing resource available on the client device exceeds the parameter associated with the computing resource requirements, and that the first parameter associated with the first computing resource available on the client device does not exceed a second parameter associated with the second computing resources available on the server device, determine that the local service availability satisfies a criterion, wherein the first parameter and the second parameter include two of: an amount of disk space, an amount of memory, or a number of central processing units (CPUs); and
- responsive to the determination that the local service availability satisfies the criterion, cause the function of the service to be executed on the server device.

15. The non-transitory computer-readable storage medium of claim 14, wherein the execution parameter reflects the computing resource requirements comprising at least one of: the amount of disk space, the amount of memory, or the number of CPUs.

16. The non-transitory computer-readable storage medium of claim 14, wherein the execution parameter of the service is exposed by an application programming interface (API).

17. The non-transitory computer-readable storage medium of claim 15, wherein the instructions, when executed by the processing device, cause the processing device further to:
- responsive to a determination that the first parameter associated with the first computing resource available on the client device does not exceed the parameter associated with the computing resource requirements, determine that the local service availability satisfies the criterion; and
- responsive to determining the determination that the first parameter associated with the first computing resource available on the client device exceeds the parameter associated with the computing resource requirements:
  - compare the first parameter associated with the first computing resource available on the client device to the second parameter associated with the second computing resource available on the server device; and
  - responsive to a determination that the first parameter associated with the first computing resource available on the client device exceeds the second parameter associated with the second computing resource available on the server device, determine, based on the comparison, that the local service availability does not satisfy the criterion.

18. The non-transitory computer-readable storage medium of claim 14, wherein the instructions, when executed by the processing device, cause the processing device further to:
- access an endpoint associated with the service;
- transmit, to the endpoint, the request to perform the function of the service;
- receive a result from the endpoint; and
- transmit the result to the client extension.

19. The non-transitory computer-readable storage medium of claim 18, wherein the endpoint associated with the service is on a cloud computing environment.

20. The non-transitory computer-readable storage medium of claim 18, wherein the instructions, when executed by the processing device, cause the processing device further to:
- in response to the determination that the local service availability does not satisfy the criterion, cause the function of the service to be executed on the client device, the endpoint associated with the service is on the client device.

* * * * *